(12) United States Patent
Ferrara, Jr. et al.

(10) Patent No.: US 10,493,701 B2
(45) Date of Patent: Dec. 3, 2019

(54) SYSTEM AND METHOD FOR ORTHOGONALLY ARRANGING EJECTORS IN A THREE DIMENSIONAL OBJECT PRINTER

(71) Applicant: Xerox Corporation, Norwalk, CT (US)

(72) Inventors: Joseph M. Ferrara, Jr., Webster, NY (US); Timothy J. Clark, Weedsport, NY (US); Douglas E. Proctor, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 921 days.

(21) Appl. No.: 14/872,561

(22) Filed: Oct. 1, 2015

(65) Prior Publication Data

US 2017/0095974 A1    Apr. 6, 2017

(51) Int. Cl.
*B29C 64/112*    (2017.01)
*B29C 67/00*    (2017.01)
*B33Y 10/00*    (2015.01)
*B33Y 30/00*    (2015.01)
*B33Y 50/02*    (2015.01)

(52) U.S. Cl.
CPC ......... *B29C 67/0059* (2013.01); *B33Y 10/00* (2014.12); *B33Y 30/00* (2014.12); *B33Y 50/02* (2014.12)

(58) Field of Classification Search
CPC ................... B29C 64/205; B29C 64/209
See application file for complete search history.

(56) References Cited

U.S. PATENT DOCUMENTS

| | | | |
|---|---|---|---|
| 8,666,142 B2 | 3/2014 | Shkolnik et al. | |
| 9,067,446 B1 | 6/2015 | Moore et al. | |
| 2015/0056317 A1 | 2/2015 | Chen | |
| 2015/0120033 A1 | 4/2015 | Hotta et al. | |
| 2015/0239176 A1* | 8/2015 | Ho | B29C 64/386 425/132 |

FOREIGN PATENT DOCUMENTS

CN    202537706 U    11/2012

* cited by examiner

*Primary Examiner* — Jeffrey M Wollschlager
*Assistant Examiner* — Armand Melendez
(74) *Attorney, Agent, or Firm* — Maginot Moore & Beck LLP

(57) ABSTRACT

A printer that forms three-dimensional objects has two printheads, one of which is positioned to eject material drops in a direction that is parallel to a plane of a planar member on which an object is formed by the two printheads.

7 Claims, 4 Drawing Sheets

SYSTEM AND METHOD FOR ORTHOGONALLY ARRANGING EJECTORS IN A THREE DIMENSIONAL OBJECT PRINTER

TECHNICAL FIELD

The device disclosed in this document relates to printers that produce three-dimensional objects and, more particularly, to printers that produce three-dimensional objects having different materials.

BACKGROUND

Digital three-dimensional manufacturing, also known as digital additive manufacturing, is a process of making a three-dimensional solid object of virtually any shape from a digital model. Polyjet three-dimensional printing is an additive process in which curable liquid photopolymer drops are ejected from an ejector head to form successive layers of material on a substrate in different shapes to produce an object. Three-dimensional printing is distinguishable from traditional object-forming techniques, which mostly rely on the removal of material from a work piece by a subtractive process, such as cutting or drilling.

Some printers that produce three-dimensional objects use a flat staging area onto which one or more printheads positioned above the area eject drops downwardly to build layers of material and form an object in the area. The printhead is typically substantially smaller than the stage so either the printhead or the stage are moved in a process direction and cross-process direction, which are orthogonal to one another in the same plane. The printhead is moved multiple times to form each layer of the object. Additionally, one of the stage and the printhead are moved in a vertical direction relative to the plane of the process and cross-process direction plane to maintain an appropriate distance between the printhead and the object being built.

Currently, object printing is performed by positioning the printhead(s) above the platen and orienting the printhead(s) so they eject material drops downwardly towards the platen. In this manner, the object is built layer by layer with different materials being provided by different printheads. Because the object is built from the bottom up, outward projections require layers of support material to be built beneath the layer where the build material for the object is ejected. Additionally, object geometries can make the provision of low friction surfaces and the like on the sides of the object difficult to provide. Having a three-dimensional object printer that enables different orientations of material ejection would be useful.

SUMMARY

A printer that uses at least two orthogonally oriented printheads to produce three-dimensional objects includes a planar support member, a first printhead oriented orthogonally to a plane of the planar support member, a second printhead located at a first position that is oriented to be parallel with the plane of the planar support member, at least one actuator operatively connected to the first printhead and the second printhead, the at least one actuator being configured to move the first printhead and the second printhead with reference to the planar support member, and a controller operatively connected to the at least one actuator, the first printhead, and the second printhead. The controller is configured to process image data to generate planes of an object to be produced that are orthogonal to one another, to operate the at least one actuator to move the first printhead and the second printhead to enable the first printhead to eject drops of material in a direction perpendicular to the plane of the planar support member and to enable the second printhead to eject drops of material in a direction parallel to the plane of the planar support member.

A method of operating a printer to produce three-dimensional objects with at least two orthogonally oriented printheads includes processing image data with a controller to generate orthogonal planes of an object to be produced, operating with the controller a first printhead that is oriented orthogonally to a plane of a planar support member to eject drops of material towards the planar support member, operating with the controller a second printhead located at a first position that is oriented to be parallel with the plane of the planar support member to eject drops of materials in the plane parallel to the plane of the planar support member, and operating with the controller at least one actuator operatively connected to the first printhead and the second printhead to move the first printhead and the second printhead with reference to the planar support member to enable the first printhead to eject drops of material in a direction perpendicular to the plane of the planar support member and to enable the second printhead to eject drops of material in a direction parallel to the plane of the planar support member.

BRIEF DESCRIPTION OF THE DRAWINGS

The foregoing aspects and other features of a printer that generates three-dimensional objects with orthogonally oriented printheads are explained in the following description, taken in connection with the accompanying drawings.

DETAILED DESCRIPTION

Figure 1:
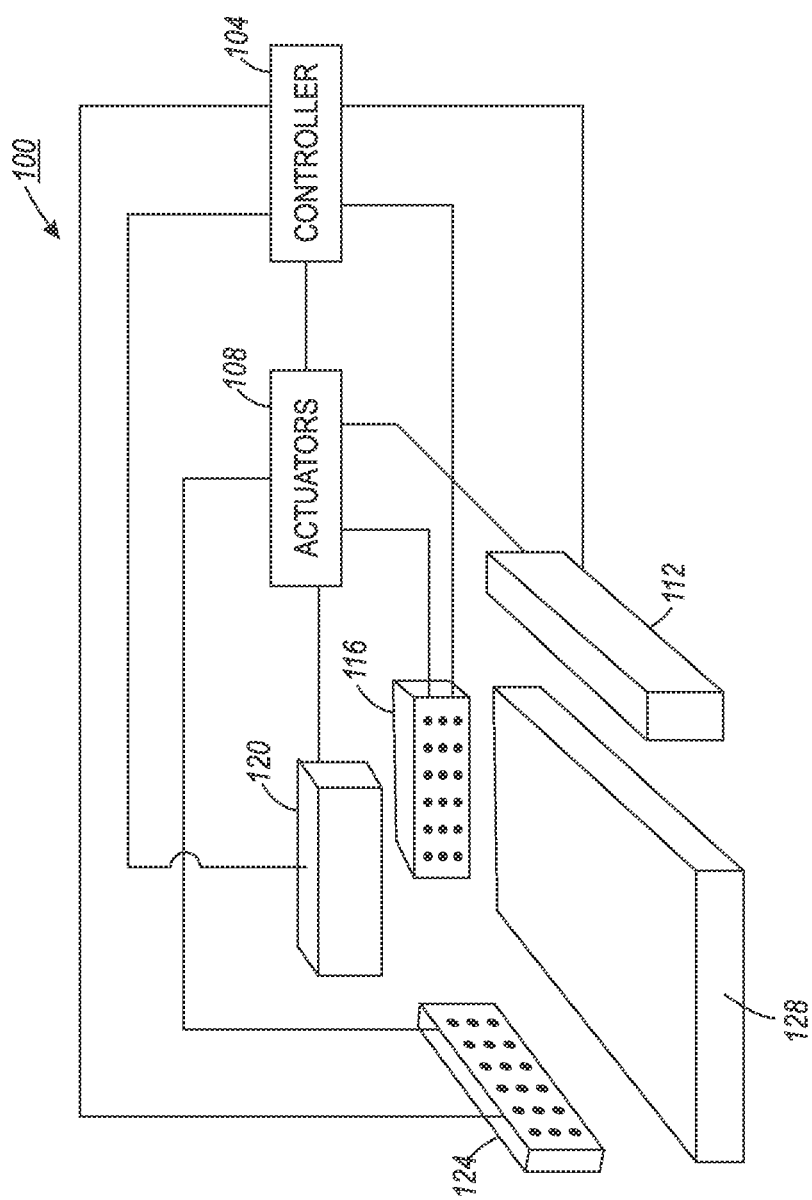
FIG. 1 is a perspective view of components in a printer that produces three-dimensional objects with orthogonally oriented printheads.

For a general understanding of the environment for the device disclosed herein as well as the details for the device, reference is made to the drawings. In the drawings, like reference numerals designate like elements.

FIG. 1 shows a configuration of components in a printer 100, which produces a three-dimensional object or part on a platen. The printer 100 includes a controller 104, one or more actuators 108, printheads 112, 116, 120, and 124, and a platen 128. The printheads 112, 116, 120, and 124 are fluidly connected to sources of support materials and build materials as known. The printheads are operated by the controller 104 with reference to three-dimensional image data in a memory operatively connected to the controller to eject the support and build materials supplied to each respective printhead. In some embodiments, some of the ejectors in the same printhead are fluidly connected to a source of support material and some of the ejectors are fluidly connected to a source of at least one and sometimes more than one source of build material. The printheads are also operatively connected to one or more actuators 108 to enable the actuators to move and rotate the printheads with reference to the platen 128. The build material forms the structure of the part being produced, while the support material enables build material to maintain its shape while the material solidifies as the part is being constructed. After the part is finished, the support material is removed by washing, blowing, or melting.

The controller 104 is also operatively connected to the one or more actuators 108 to control movement of the printheads relative to one another and to the platen 108. In the embodiment shown in FIG. 1, printhead 120 is oriented to eject material drops so they move towards the platen 108 in a direction that is perpendicular to the surface of the platen. Printheads 112, 116, and 124 are oriented to eject material drops in a width or length of a plane that is parallel to the surface of platen 108. The controller 104 can also operate the actuators 108 to enable the printheads 112, 116, and 120 to move along the width and length of the parallel plane and to rotate with respect to the surface of platen 108. This movement enables the printheads to eject material drops into crevices and corners of parts being formed by the printer 100. Although printer 100 is shown with four printheads, three of which are oriented in the plane parallel to the surface of the platen 108 and the fourth oriented to eject drops in the direction that is perpendicular to the surface of the platen 108, other embodiments can include the printhead 120 and only one or two of the printheads 112, 116, and 124. For example, one embodiment is configured to enable printhead 116 to be positioned as shown and to move to the position occupied by printhead 112. That same embodiment is also configured to enable printhead 124 to be positioned as shown and to move to a position that is opposite the position of printhead 116 shown in the figure. Alternatively, an embodiment can be configured with only one of the printheads 112, 116, and 124 to move the printhead to any side of the platen 128. Once positioned, the controller 104 can operate the printhead to eject material drops in a plane parallel to the surface of the platen 128 or towards the surface of platen 128. Finally, in another embodiment, a fourth printhead is operatively connected to the actuators 108 and positioned at the location that is opposite to and facing printhead 116.

Because the printheads of the system shown in FIG. 1 are arranged orthogonally to one another, the controller 104 is configured to process the image data for the object to be produced from the various perspectives of the printheads. That is, the controller 104 processes the image data in a manner that results in signals being generated that operate ejectors that are orthogonal to one another. Previously, the image data was sliced in parallel planes that enabled operation of ejectors in a printheads that faced in the same direction towards the platen. The orthogonal configuration of the printheads shown in FIG. 1 and FIG. 2 requires that the controller prepare the image data in orthogonal planes and use these data to generate the signals for operating the ejectors in the orthogonally arranged printheads.

Figure 2:
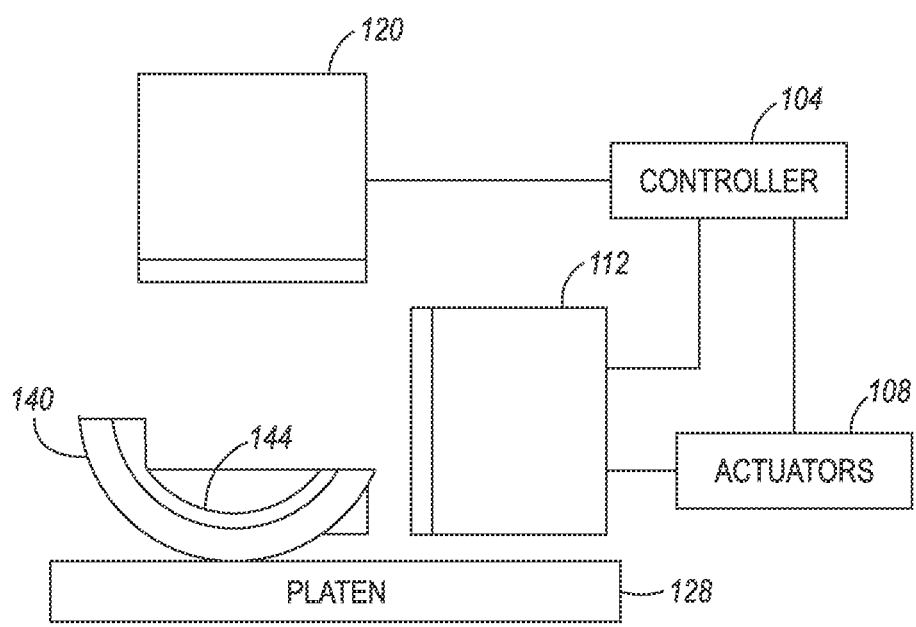
FIG. 2 depicts an object having an internal insert being built by the printer of FIG. 1.

In FIG. 2, a part 140 is being formed with an insert surface 144. After the controller 104 processes the image data to produce orthogonal planes, the controller 104 generates signals to operate the ejectors in the printhead 120 to eject drops of build material towards the platen 108 to form layers of the part 140. The controller 104 also uses the processed data to operate the ejectors in the printhead 112 to eject material drops in a direction that is perpendicular to the direction of the drops ejected by the printhead 120 to form the insert surface 144. The controller can also operate the actuators 108 to rotate the printhead 112 to facilitate the delivery of material for the insert surface onto the inner surface of the part 140. Similarly, the controller 104 uses the image data for other planes of the object that are orthogonal to the planes used to operate the other printheads to operate the ejectors in the printheads 116 and 124 to form the insert surface 144.

Figure 3:
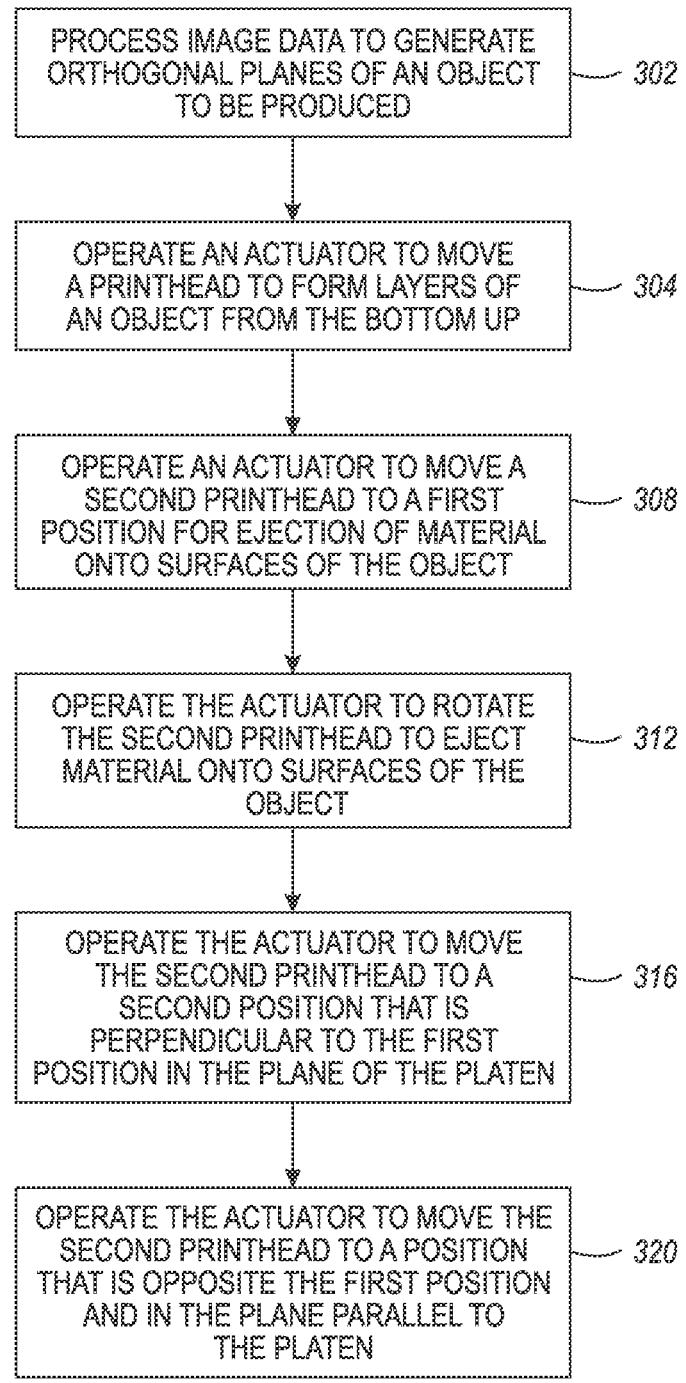
FIG. 3 is a flow diagram of a process for operating the printer of FIG. 1.

A method of operating a printer that produces three-dimensional objects with orthogonally oriented printheads is shown in FIG. 3. In the description of this method, statements that a process is performing some task or function refers to a controller or general purpose processor executing programmed instructions stored in a memory operatively connected to the controller or processor to manipulate data or to operate one or more components in the printer to perform the task or function. The controller 104 noted above can be such a controller or processor. Alternatively, the controller 104 can be implemented with more than one processor and associated circuitry and components, each of which is configured to form one or more tasks or functions described herein.

The process 300 begins with the controller processing the image data to generate planes of the object to be produced that are orthogonal to one another (block 302). The controller then operates at least one actuator to move a first printhead that is oriented orthogonally to a plane of a planar support member to eject drops of material towards the planar support member (block 304). The controller also operates the at least one actuator to move a second printhead located at a first position that is oriented to be parallel with the plane of the planar support member to eject drops of materials in the plane parallel to the plane of the planar support member (block 308). The operation of the at least one actuator to move the two printheads enables the first printhead to form layers of the object on the planar support member and the second printhead to eject material horizontally to form layers of material on surfaces that are perpendicular or primarily perpendicular to the planar support member. The process also includes the controller operating the at least one actuator to rotate the second printhead with reference to the plane of the planar member to enable the second printhead to eject material drops into corners and crevices of objects form by the first printhead (block 312). The method also includes the controller operating the at least one actuator to move the second printhead to a position that is at a right angle to the first position to enable the second printhead to eject drops of material in the direction parallel to the plane of the planar support member and at a right angle to the drops of material ejected from the second printhead at the first position (block 316). This operation enables the second printhead to move to another position that is parallel to the plane of the planar support member and perpendicular to the drops ejected by the second printhead at the first position to enable the second printhead to eject material onto other surfaces of the object formed by the first printhead. The method also includes the controller operating the at least one actuator to move the second printhead to a position that is opposite the first position to enable the second printhead to eject drops of material in the direction parallel to the plane of the planar support member and towards the drops of material ejected from the second printhead at the first position (block 320). This operation enables the second printhead to move to another position that is parallel to the plane of the planar support member to enable the second printhead to eject material onto surfaces of the object formed by the first printhead that are opposite to the second printhead when it is positioned at the first position.

Figure 4:
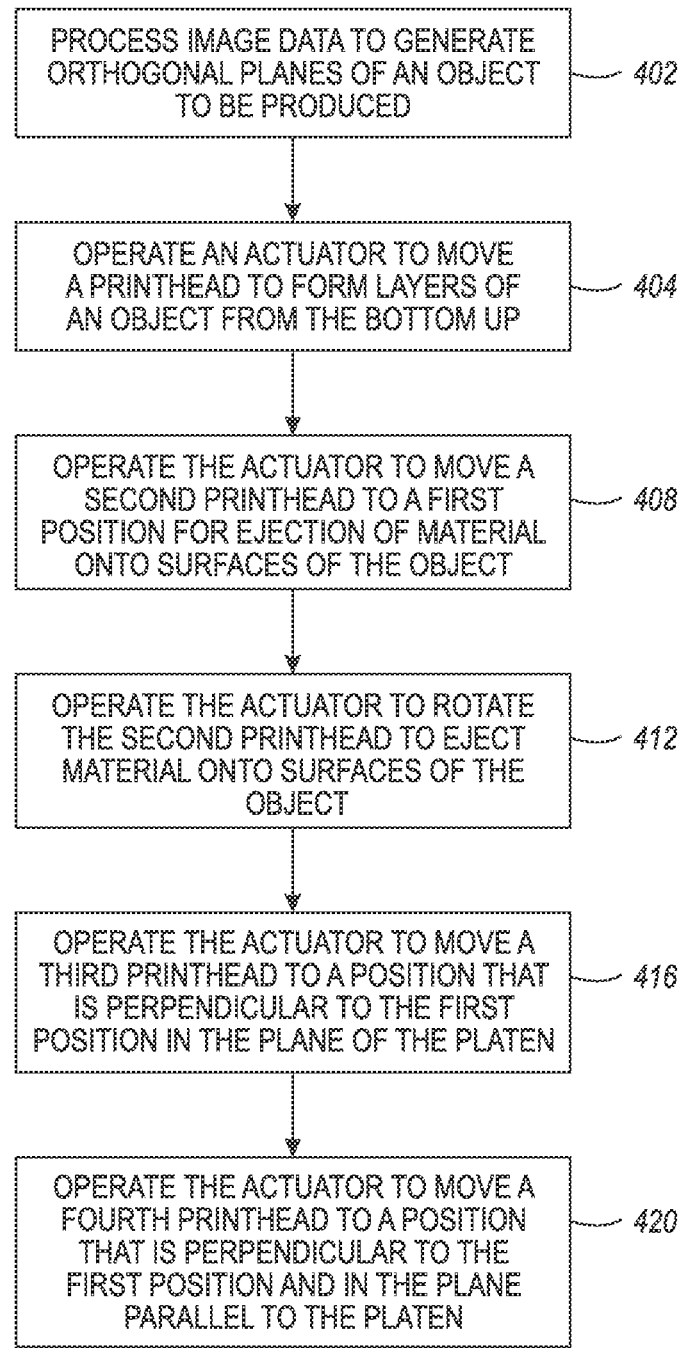
FIG. 4 is a flow diagram of a process for operating a printer with multiple printheads oriented to eject material drops in a plane parallel to the plane of the planar support member.

In embodiments with three printheads, two of which are oriented perpendicular to one another in the plane parallel to the plane of the planar support member, the method of FIG. 4 can be used. The method begins with the controller processing the image data to generate planes of the object to be produced that are orthogonal to one another (block 402). The controller operates at least one actuator to move a first printhead that is oriented orthogonally to a plane of a planar support member to eject drops of material towards the planar support member (block 404). The controller also operates the at least one actuator to move a second printhead located at a first position that is oriented to be parallel with the plane of the planar support member to eject drops of materials in the plane parallel to the plane of the planar support member (block 408). The operation of the at least one actuator to move the two printheads enables the first printhead to form layers of the object on the planar support member and the second printhead to eject material horizontally to form layers of material on surfaces that are perpendicular or primarily perpendicular to the planar support member. The process also includes the controller operating the at least one actuator to rotate the second printhead with reference to the plane of the planar member to enable the second printhead to eject material drops into corners and crevices of objects form by the first printhead (block 412). The controller also operates the at least one actuator to move a third printhead positioned at a right angle to the first position of the second printhead to enable the third printhead to eject drops of material in the direction parallel to the plane of the planar support member and at a right angle to the drops of material ejected from the second printhead at the first position (block 416). The third printhead can be positioned to the left or the right of the second printhead at the first position. In embodiments with four printheads, three of which are positioned to eject materials drops in a plane that is parallel to the plane of the planar support member, the method also includes the controller operating the at least one actuator to move a fourth printhead positioned at a right angle to the first position of the second printhead and opposite to the position of the third printhead to enable the fourth printhead to eject drops of material in the direction parallel to the plane of the planar support member and at a right angle to the drops of material ejected from the second printhead at the first position and towards the third printhead (block 420).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A three-dimensional (3D) object printer comprising:
a planar support member;
a first printhead oriented to eject drops of a first material in a direction that is orthogonal to a plane of the planar support member;
a second printhead located at a first position that is oriented to eject drops of a second material in a direction that is parallel to the plane of the planar support member;
at least one actuator operatively connected to the first printhead and the second printhead, the at least one actuator being configured to move the first printhead and the second printhead with reference to the planar support member; and
a controller operatively connected to the at least one actuator, the first printhead, and the second printhead, the controller being configured to:
process image data to generate data corresponding to a first plurality of planes of an object to be produced that are parallel to the plane of the planar support member and to generate data corresponding to a second plurality of planes that are orthogonal to the plane of the planar member so the first plurality of planes of the object are orthogonal to the second plurality of planes of the object,
operate the at least one actuator to move the first printhead and the second printhead as the controller operates the first printhead and the second printhead,
operate the first printhead using the generated data corresponding to the first plurality of planes as the at least one actuator moves the first printhead to eject drops of the first material in the direction perpendicular to the plane of the planar support member to form a first plurality of layers of an object corresponding to the first plurality of planes that are parallel to the plane of the planar support member, and
operate the second printhead using the generated data corresponding to the second plurality of planes as the at least one actuator moves the second printhead in a plane about the first position that is orthogonal to the plane of the planar member to eject drops of the second material in a direction parallel to the plane of the planar support member to form a second plurality of layers of the object corresponding to the second plurality of planes that are orthogonal to the plane of the planar support member and the first plurality of layers.

2. The 3D object printer of claim 1, the at least one actuator being further configured to:
rotate the second printhead in a plane that is normal with reference to the plane of the planar member and in a plane that is parallel to the plane of the planar member.

3. The 3D object printer of claim 1, the at least one actuator being further configured to:
move the second printhead to a position that is at a right angle to the first position to enable the second printhead to eject drops of material in the direction parallel to the plane of the planar support member and at a right angle to the drops of material ejected from the second printhead at the first position.

4. The 3D object printer of claim 1, the at least one actuator being further configured to:
move the second printhead to a position that is opposite the first position to enable the second printhead to eject drops of material in the direction parallel to the plane of the planar support member and towards the drops of material ejected from the second printhead at the first position.

5. The 3D object printer of claim 1 further comprising:
a third printhead positioned at a right angle to the first position of the second printhead to enable the third printhead to eject drops of material in the direction parallel to the plane of the planar support member and at a right angle to the drops of material ejected from the second printhead at the first position.

6. The 3D object printer of claim 5 further comprising:
a fourth printhead positioned at a right angle to the first position of the second printhead and opposite to the position of the third printhead to enable the fourth printhead to eject drops of material in the direction parallel to the plane of the planar support member and at a right angle to the drops of material ejected from the second printhead at the first position and towards the third printhead.

7. The 3D object printer of claim 6, the at least one actuator being further configured to:
move the fourth printhead to a position that is opposite to the position of the third printhead to enable the fourth printhead to eject drops of material in the direction parallel to the plane of the planar support member and at a right angle to the drops of material ejected from the second printhead at the first position and towards the third printhead.

* * * * *